United States Patent
Böhm et al.

(10) Patent No.: US 7,337,872 B2
(45) Date of Patent: Mar. 4, 2008

(54) HYDRAULIC POWER ASSISTED STEERING SYSTEM

(75) Inventors: Jürgen Böhm, Oberneisen (DE); Steffen Linkenbach, Eschborn (DE); Oliver Hoffmann, Frankfurt (DE); Joachim Nell, Hanau (DE); Andreas Schirling, Pfungstadt (DE); Norman Muth, Frankenberg (DE); Johannes Görlach, Langgöns (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 286 days.

(21) Appl. No.: 10/504,211

(22) PCT Filed: Feb. 17, 2003

(86) PCT No.: PCT/EP03/01552

§ 371 (c)(1),
(2), (4) Date: Aug. 11, 2004

(87) PCT Pub. No.: WO03/072418

PCT Pub. Date: Sep. 4, 2003

(65) Prior Publication Data

US 2005/0160851 A1    Jul. 28, 2005

(30) Foreign Application Priority Data

Feb. 27, 2002 (DE) .................. 102 08 519
Dec. 3, 2002 (DE) .................. 102 56 306

(51) Int. Cl.
*B62D 5/04*    (2006.01)
*B62D 5/06*    (2006.01)

(52) U.S. Cl. .................. 180/446; 180/422

(58) Field of Classification Search .......... 180/443, 180/444, 446, 404–407, 417, 419, 421–423, 180/427–428; 701/41–43
See application file for complete search history.

(56) References Cited

U.S. PATENT DOCUMENTS

| 4,681,182 A | * | 7/1987 | Suzuki et al. | 180/444 |
| 4,909,343 A | * | 3/1990 | Mouri et al. | 180/422 |
| 5,086,859 A | * | 2/1992 | Takahashi et al. | 180/446 |
| 5,785,144 A | * | 7/1998 | Cakmaz et al. | 180/422 |
| 5,854,987 A | * | 12/1998 | Sekine et al. | 701/41 |

(Continued)

FOREIGN PATENT DOCUMENTS

DE    199 11 892 A1    9/2000

(Continued)

OTHER PUBLICATIONS

International Search Report of Application No. PCT/EP03/01552 dated May 22, 2003.

Primary Examiner—Lesley D. Morris
Assistant Examiner—Marc A. Scharich
(74) Attorney, Agent, or Firm—RatnerPrestia (57) ABSTRACT

A hydraulic power steering system with a steering gear and a hydraulic actuator for supporting a steering wheel actuation by the driver of a vehicle, in particular a motor vehicle, includes components for actively applying an additional steering torque, the components for actively applying an additional steering torque including at least one additional torque actuator and a steering torque detector being mounted as a module on a steering wheel shaft that connects the steering wheel to the steering gear.

17 Claims, 7 Drawing Sheets

U.S. PATENT DOCUMENTS

| | | | | |
|---|---|---|---|---|
| 5,893,430 | A * | 4/1999 | Koike | 180/443 |
| 5,931,256 | A * | 8/1999 | Langkamp | 180/422 |
| 6,052,633 | A * | 4/2000 | Fukuyama et al. | 701/41 |
| 6,131,059 | A * | 10/2000 | Kaji et al. | 701/41 |
| 6,158,545 | A * | 12/2000 | Kaji et al. | 180/446 |
| 6,285,936 | B1 * | 9/2001 | Bohner et al. | 701/41 |
| 6,470,994 | B1 * | 10/2002 | Shimizu et al. | 180/446 |
| 6,561,306 | B2 * | 5/2003 | Watanabe et al. | 180/444 |
| 6,654,674 | B2 * | 11/2003 | Lu et al. | 701/36 |
| 6,877,584 | B2 * | 4/2005 | Jonokuchi et al. | 180/446 |
| 6,926,114 | B2 * | 8/2005 | Bolourchi et al. | 180/422 |

FOREIGN PATENT DOCUMENTS

| EP | 0 580 997 A1 | 6/1993 |
|---|---|---|
| EP | 1 142 746 A2 | 10/2001 |

* cited by examiner

HYDRAULIC POWER ASSISTED STEERING SYSTEM

TECHNICAL FIELD

The present invention relates to a hydraulic power steering system with a steering gear and a hydraulic actuator for supporting a steering wheel actuation by the driver of a vehicle, in particular a motor vehicle, with means associated therewith for actively applying an additional steering torque.

BACKGROUND OF THE INVENTION

Up-to-date motor vehicles, in particular passenger vehicles, are generally equipped with hydraulic or electro-hydraulic power steering systems, hereinbelow referred to as 'hydraulic power steering systems'. The power assistance is configured such that actuators, e.g. hydraulic cylinders, are arranged in the medium range of the steering mechanism. A force generated by the actuators is used to support the actuation of the steering mechanism as a reaction to the rotation of the steering wheel (torque support). The torque to be applied for steering the vehicle is thus reduced and the driver relieved during the steering maneuver.

It is known in the art to design the torque assistance or steering boosting speed-responsively. At low vehicle speeds being typical of pulling in or out of a parking space, a very easy-running steering system with a high degree of torque support is preferred, while heavier steering with a low degree of torque support is desirable at high driving speeds.

BRIEF SUMMARY OF THE INVENTION

An object of the invention is to provide a hydraulic power steering system, which enables a variable torque support and can easily be integrated into hydraulic power steering systems provided.

This object is achieved by the features of the independent claims. Dependent claims relate to preferred embodiments of the invention.

The term 'steering wheel' herein implies all feasible actuating devices for steering a vehicle such as a steering wheel, control stick, or 'joystick'.

It is essential for the invention that the means for actively applying an additional steering torque is configured as a unit comprising at least one additional torque actuator and a means detecting the steering torque and being mounted as a module on a steering wheel shaft that connects the steering wheel to the steering gear.

The invention discloses that the additional torque actuator includes an electric motor that is coupled to the steering column.

The invention discloses that the means for the active application of an additional steering torque includes an electric motor, a redundant electronic controlling and regulating unit (ECU), and a redundant steering wheel torque sensor.

The invention discloses that the means for the active application of an additional steering torque includes a gear cooperating with the additional torque actuator. According to the invention, the gear is a belt drive, a helical worm gear, or a spur gear, preferably a belt drive.

The invention discloses that an electronic controlling and regulating unit (ECU) actuates the additional torque actuator to produce an additional steering wheel torque adapted to the current vehicle speed.

The invention discloses that the electronic controlling and regulating unit (ECU) actuates an additional torque actuator to produce an additional steering wheel torque that is adapted to the vehicle's course and the shape of the road.

To this end, there is favorable provision of a nominal track detecting means for determining a nominal track or a nominal track angle from a detected or estimated shape of the road, an actual track detecting means for determining an actual track and an actual track angle from a detected or estimated vehicle course, a comparison means for comparing the nominal track and the nominal track angle with the actual track and the actual track angle, and a zero-point displacement means in order to displace the zero point of the characteristic curve for supporting the steering handle according to the comparison.

According to the invention, an electronic controlling and regulating unit (ECU) actuates the additional torque actuator to produce an additional steering wheel torque adapted to the current vehicle dynamics, in particular the current transverse acceleration.

According to the invention, the additional torque actuator is an electromechanical, electromagnetic, or hydraulic actuator.

The object of the invention is also achieved by a hydraulic power steering system, including a steering gear and a hydraulic actuator for supporting a steering wheel actuation by the driver of a vehicle, in particular a motor vehicle, associated with which is a means for the active application of an additional steering torque, characterized in that the means for the active application of an additional steering torque includes at least one additional torque actuator and is configured as a unit that is arranged as a module at a steering-wheel sided end portion of the steering valve of a hydraulic power steering system.

Preferably, a driving means of the additional torque actuator is engaged in a toothed system on the input shaft of the steering valve.

DETAILED DESCRIPTION OF THE PREFERRED EMBODIMENTS

Figure 1:
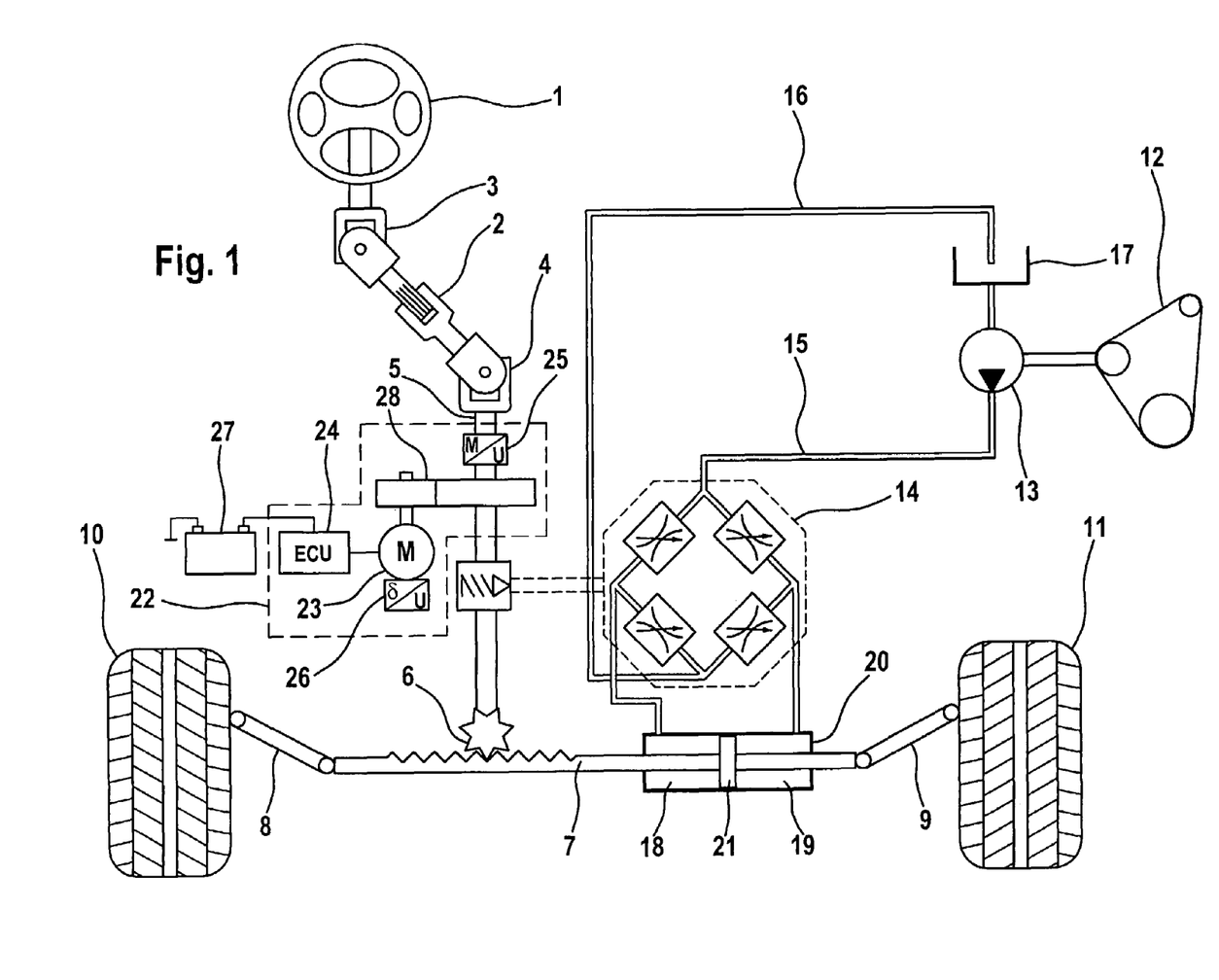
FIG. 1 is a schematic view of an embodiment of the power steering system of the invention with an electromechanical actuator.

The steering system illustrated in FIG. 1 comprises a steering wheel 1, and a steering column 2 with two universal joints 3, 4 connected to the steering wheel 1. Steering column 2 is connected to or part of a steering wheel shaft 5 that actuates the steering tie rods 8, 9 secured laterally to a steering rack 7 by way of a steering gear 6, a steering rod 7, herein configured as steering rack, thereby causing tilting of the wheels 10, 11. In the rack-and-pinion steering shown herein, hydraulic boosting is realized by means of a hydraulic pump 13 driven by the driving engine of the vehicle, e.g. by means of a belt drive 12, said pump 13 conveying pressurized fluid to a steering valve 14 through a conduit 15. The pressure fluid can flow back into a supply tank 17 through a return conduit 16. In the straight-ahead position of the steering wheel, a constant oil flow propagates through the steering valve being in its neutral position (open center) and back through the return conduit 16. The pressure in two chambers 18, 19 of a working cylinder 20 arranged on the steering rack 7 is equalized. There is no power steering. The steering rack 7 and thus also piston 21 is displaced when the steering wheel 1 is turned. The pressure of the pressure fluid supports the movement of the piston 21. As this occurs, valve 14 additionally causes pressure fluid to flow from one chamber into the other chamber so that the whole steering actuation is hydraulically boosted.

The conventional hydraulic power steering system described above comprises a unit 22 for producing an additional torque, including an additional torque actuator 23, herein an electric motor 23, a redundant control unit ECU 24 for actuating the motor 23 and evaluating signals of a redundant steering torque sensor 25, and a sensor 26 for the motor position. The electronic components are connected to an electric energy source 27. The control unit ECU 24 and the torque sensor 25 are preferably redundant. Unit 22 also comprises the control unit ECU 24 herein. However, the control unit ECU 24 can also be arranged separately according to the invention. Preferably, unit 22 comprises at least an additional torque actuator 23, a steering torque sensor 25 and, as the case may be, a sensor 26 for the motor position.

The unit 22 for producing an additional torque can also influence actively the steering wheel torque or steering torque, which is defined by the steering system characteristics and the acting forces. As this occurs, the electric motor 23 generates an additional torque (additional steering torque) and applies it to the steering rod. There is the possibility of adding the torque to the steering wheel torque predefined by construction or to deduct it therefrom. The motor torque can be transmitted with or without speed increasing ratio directly or, as illustrated herein, by way of a gear 28. The gear used herein can be a belt drive, a helical worm gear, or a spur gear.

When the unit 22 for producing an additional torque fails, the servo-assisted steering characteristics known to the driver is preserved. Unit 22 is fail-silent to this end. This means it is deactivated in a case of malfunction.

Favorably, a conventional power steering system without modifications to the characteristics can be used by means of the unit 22 of the invention producing an additional torque. The unit 22 having the capacity of a module, is directly added to a conventional hydraulic power steering system in order to gain in functions.

Figure 2:
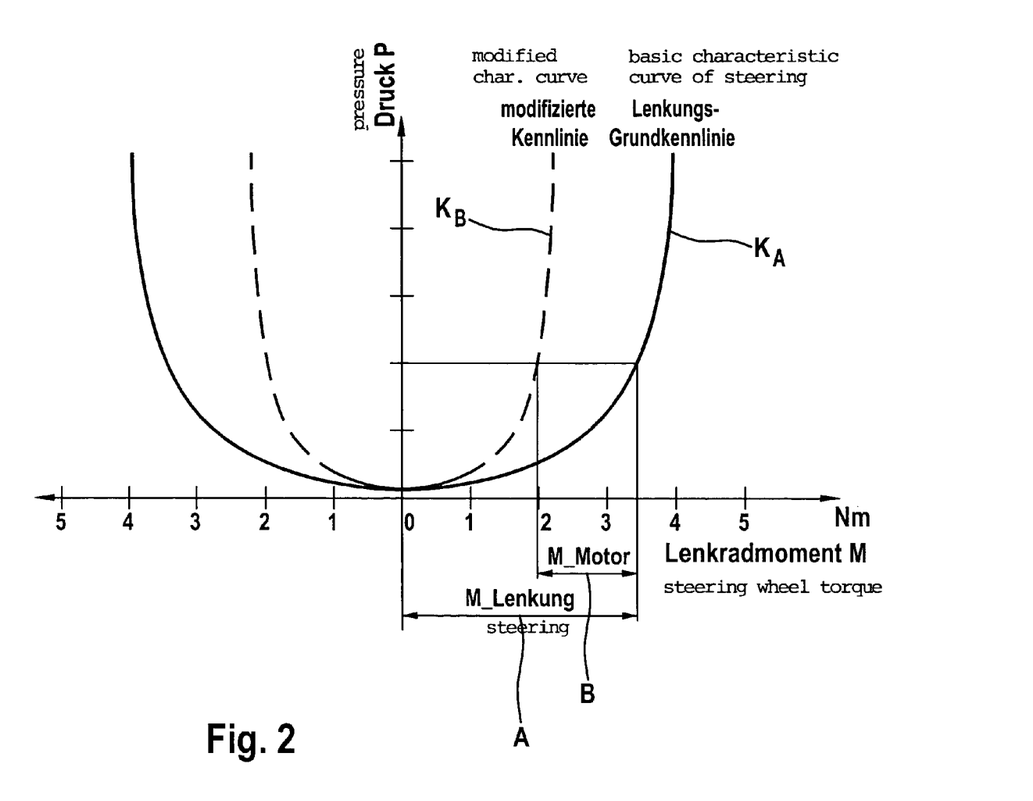
FIG. 2 depicts a characteristic curve of a power steering system.

The invention renders it possible to vary the boosting characteristic curve by producing an additional torque (see FIG. 2). The boosting characteristic curve herein means the dependency of the steering wheel torque or the actuating torque M on the prevailing system pressure P of the hydraulic boosting. The torque A (M_steering) is reduced by an active application of an additional torque B (M_motor) in the example shown. This implies that the steering activity of the driver is supported to a greater extent. The result is a modified characteristic curve (dotted curve $K_B$) with a lower actuating force compared to the original characteristic curve (solid curve $K_A$). An active assistance can be imparted to the driver in addition. A steering recommendation is then given by way of a torque adaptation or variation, or a torque support will render steering more difficult for the driver in order to warn him/her about hazards.

Figure 3:
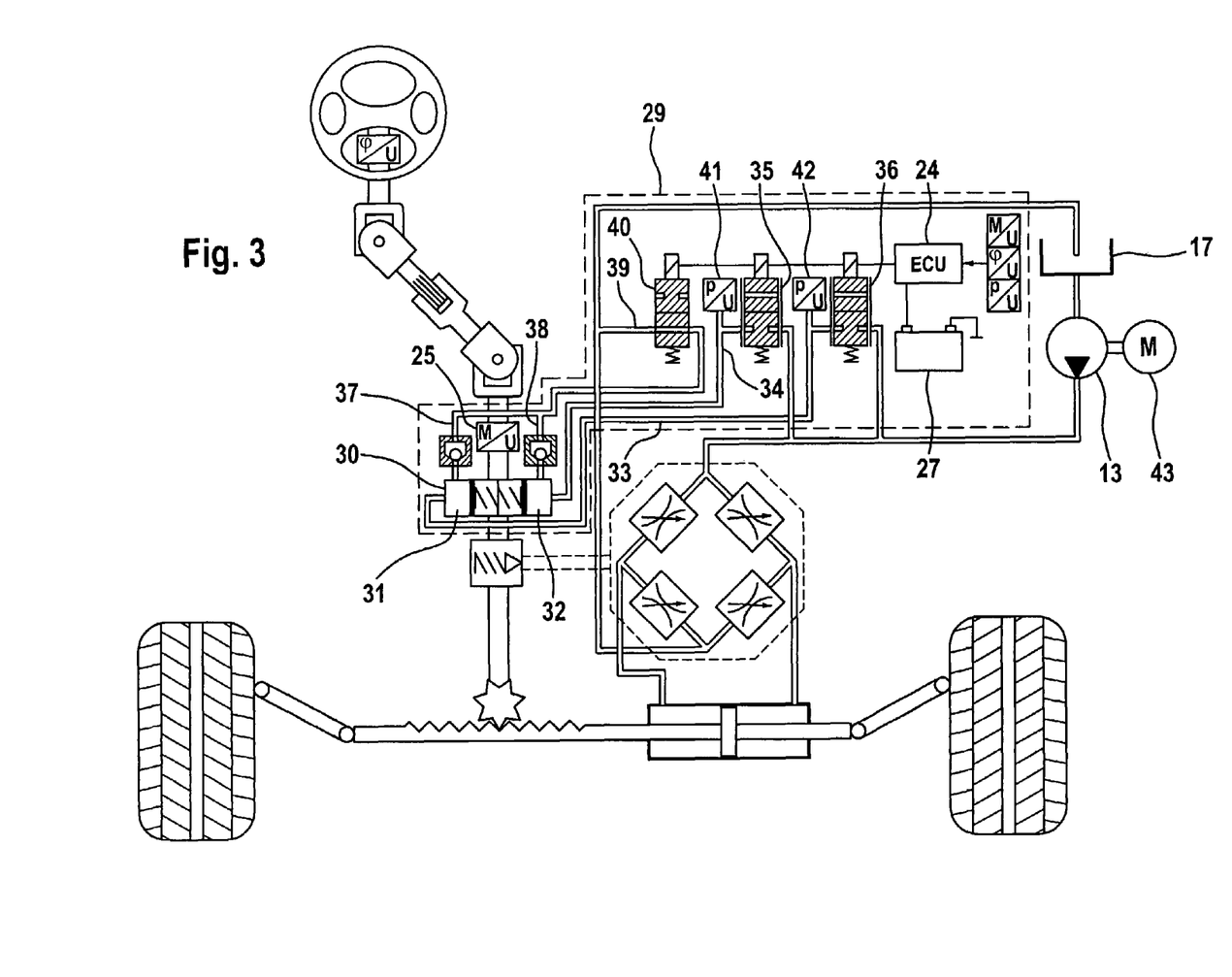
FIG. 3 is a schematic view of an embodiment of the power steering system of the invention with a hydraulic actuator.
Figure 4:
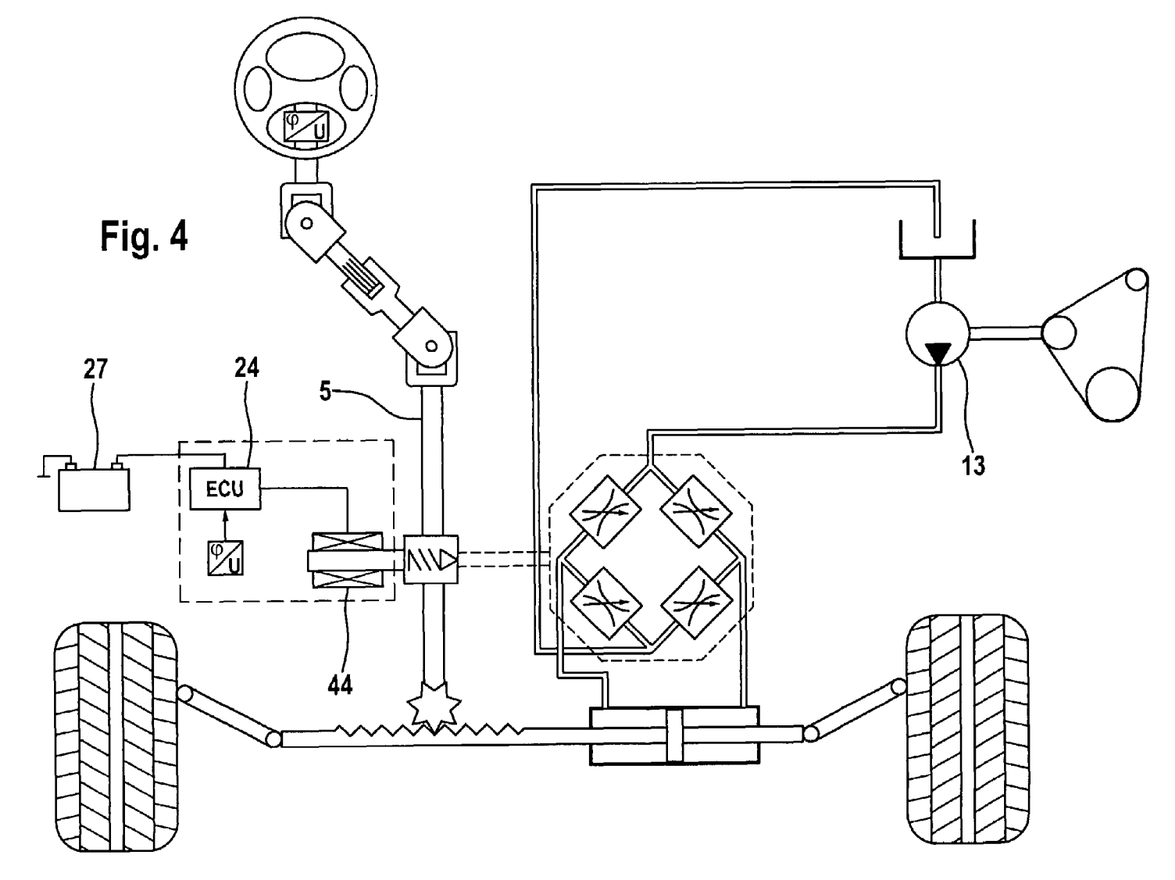
FIG. 4 illustrates an embodiment of the power steering system of the invention with a magnetic additional torque actuator.

It is also possible to produce an additional torque by means of a hydraulic additional torque actuator (see FIG. 3) or by a magnetic additional torque actuator (see FIG. 4).

The basic steering system with hydraulic assistance is identical to the system shown in FIG. 1 and, therefore, will not be explained in detail.

A unit 29 with a hydraulic additional torque actuator 30 produces the additional torque in the system illustrated in FIG. 3.

The hydraulic additional torque actuator 30 includes two hydraulic chambers 31, 32 to which a pressurized fluid can be applied by way of hydraulic conduits 33, 34 in which one hydraulic, electromagnetically operable valve 35, 36 is respectively incorporated. From the hydraulic chambers 31, 32, the pressure fluid can be returned into the supply tank 17 by way of conduits 37, 38 into which respectively one non-return valve is inserted and through a subsequent common conduit 39 into which a hydraulic, electromagnetically operable valve 40 is inserted.

For the purpose of pressure control in chambers 31, 32 and, thus, for additional torque control, valves 35, 36, 40 are actuated by a preferably redundant control unit ECU 24 on command of the signals of the redundant steering torque sensor 25 and of two pressure sensors 41, 42.

Preferably, an electric motor 43 of its own rather than (compulsorily) the driving engine of the vehicle (cf. FIG. 1) drives the pump in this arrangement. A corresponding actuation of the motor 43 allows the pump 13 to produce the hydraulic pressure in conformity to requirements, whereby energy can be economized.

An electromagnetic additional torque actuator 44 actuated by the control unit ECU 24 produces an additional torque in the embodiment illustrated in FIG. 4.

Figure 5:
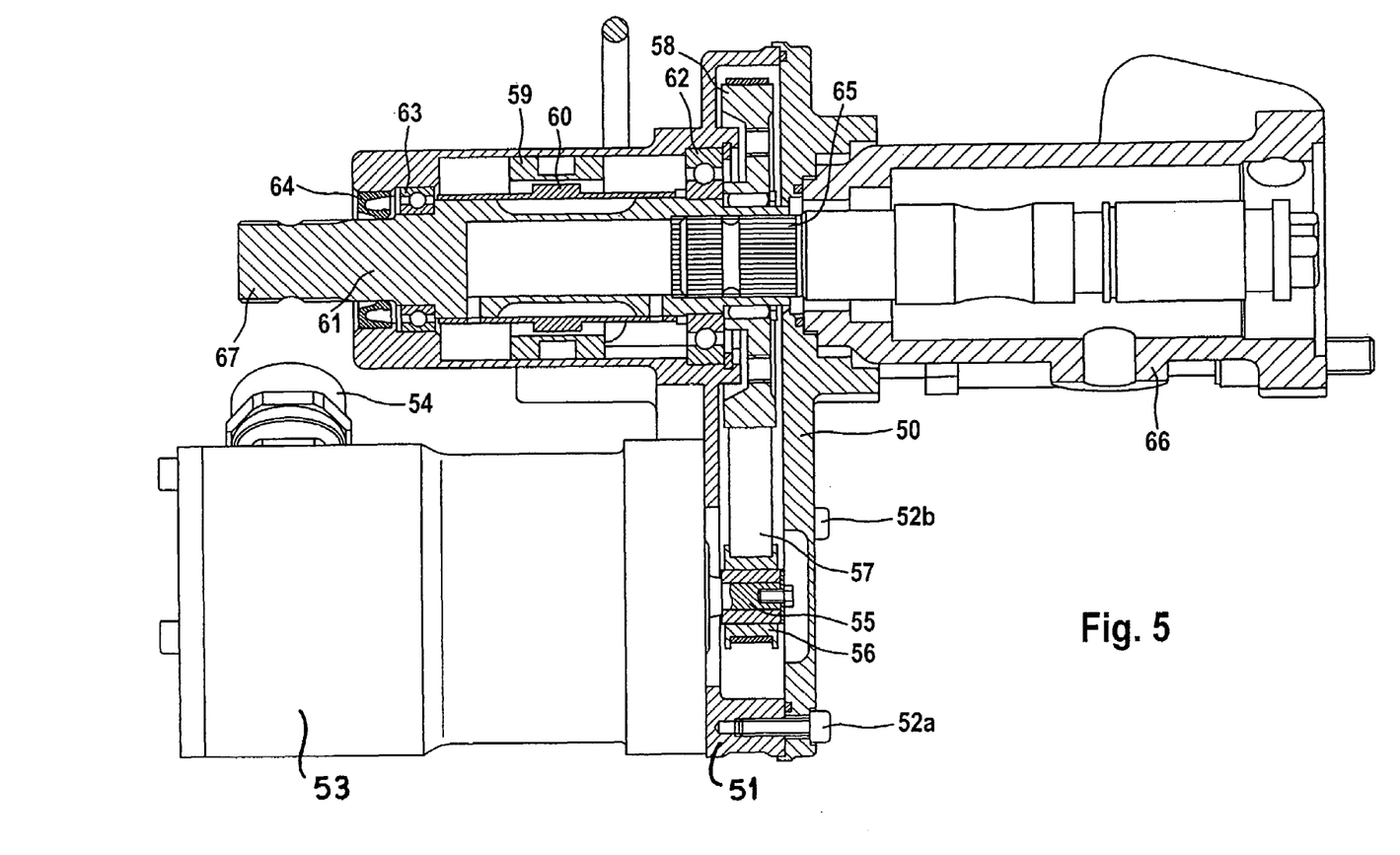
FIG. 5 is a schematic view of a cross-section taken through an embodiment of the electromechanical actuator unit of the invention.

The electromechanical additional torque actuator shown in FIG. 5 includes a first housing component 50 and a second housing component 51 interconnected by way of a screw coupling 52a, 52b. An electric motor 53 is mounted on the housing component 51 and connected to a control unit and current supply by an electric connection 54. The output shaft 55 of motor 53 is connected to a first pulley 56 connected by way of a belt, preferably toothed belt 57, to a second pulley 58. The second pulley 58 preferably has a larger diameter so that a gear increasing ratio of 1:2 to 1:5, preferably 1:4 approximately, is achieved. A torque sensor 59, 60 for sensing the steering wheel torque is arranged in the second housing component 51.

Associated with sensor 59, 60 is a shaft 61 which is connected to the second housing component 51 by way of bearings 62, 63 and sealed by means of a seal 64 (shaft sealing ring). Favorably, the first housing component 50 is arranged directly at the inlet of a steering valve 66 close to the steering wheel, or connected to the steering valve. The toothing of a peg 65 close to the steering wheel is engaged directly into corresponding counterparts (recesses) of the shaft 61. The steering-wheel-sided end portion 67 of shaft 61 is configured like peg 65, thereby permitting engagement of a correspondingly shortened steering wheel shaft coupled to the steering wheel of the vehicle. This design renders it possible to mount the unit for producing an additional torque into a 'shortened' steering column of the vehicle favorably without further modifications at the steering system.

Figure 6:
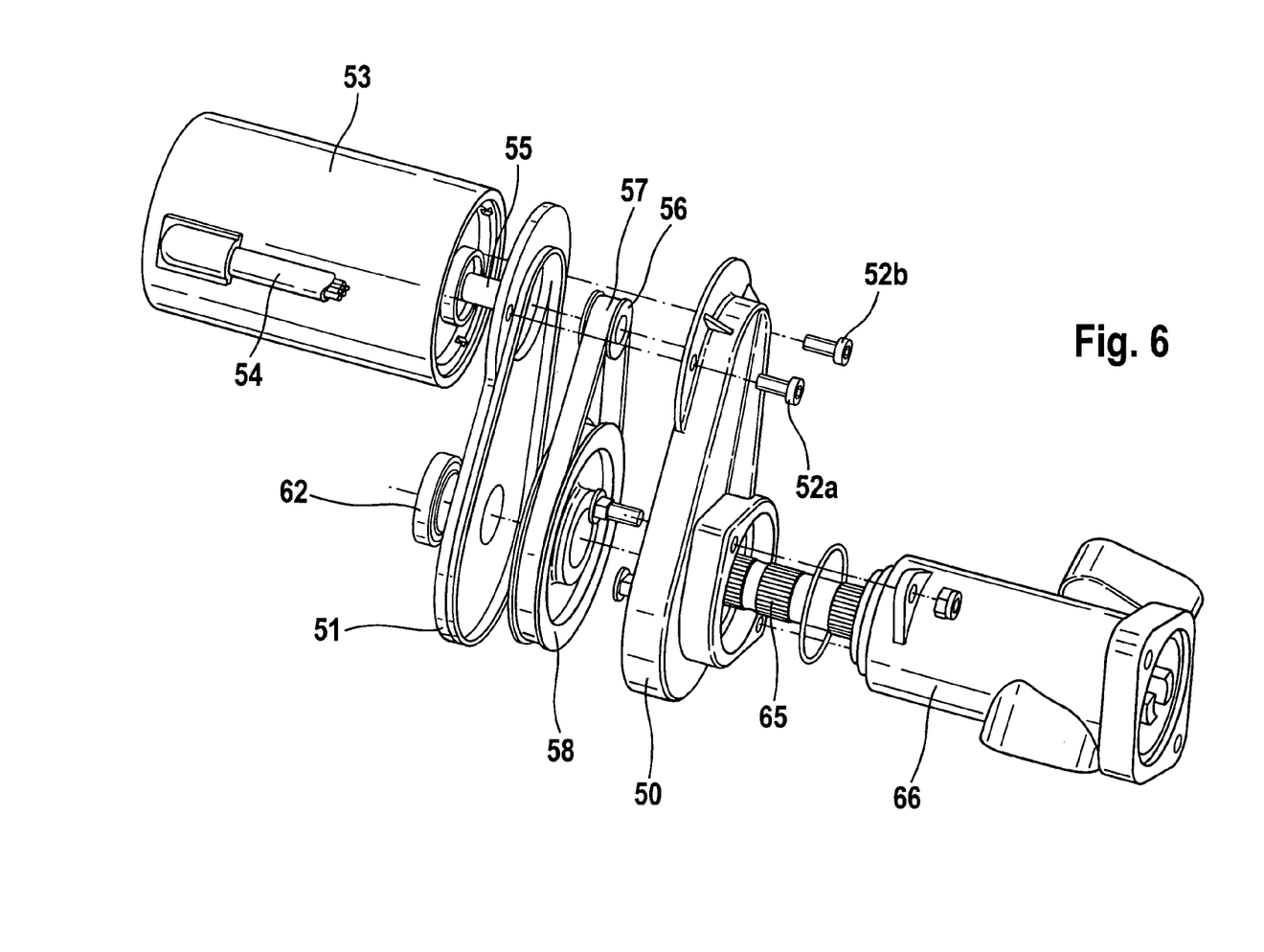
FIG. 6 is a perspective exploded view of the electromechanical additional torque actuator.
Figure 7:
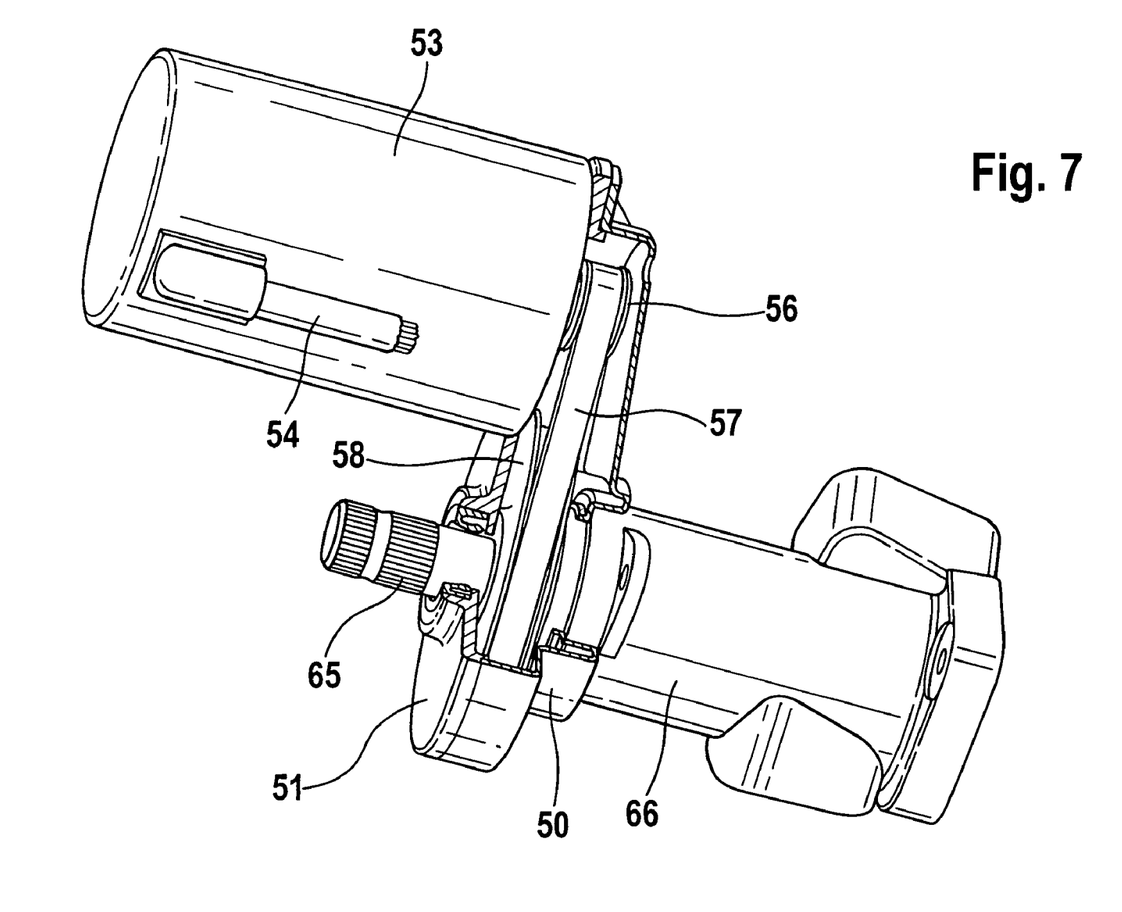
FIG. 7 is a perspective view of the assembled unit of the electromechanical additional torque actuator.

The electromechanical additional torque actuator of the unit illustrated in FIG. 5 is shown in an exploded view in FIG. 6 and in a perspective view in FIG. 7 as overall component having a connection to the steering valve. Therefore, the actuator is not explained in detail in the following, and like reference numerals have been assigned to like components. The drawings depict the especially favorable compact construction that permits ease of integration into existing steering systems. The result is that the electromechanical drive—apart from shortening the steering column—can be mounted into existing systems with very low technical effort. The technical effort needed for the additional torque actuator is also relatively low. This allows a comparatively low-cost manufacture of said actuator and, further, renders it relatively safe against malfunctions or failure.

The invention claimed is:

1. A power steering system with a steering gear and a hydraulic actuator for supporting a steering wheel actuation by a driver of a vehicle, the power steering system comprising a modular torque actuator that applies additional steering torque, the modular torque actuator being mounted as a modular unit on a steering wheel shaft that connects a steering wheel to the steering gear, the modular unit comprising a housing, an electric motor mounted on the housing, an output shaft on the motor extending generally parallel to the steering wheel shaft, a gear in the housing connected to the output shaft, a torque sensor for sensing steering wheel torque, and a torque applying shaft connected with the gear, the torque applying shaft having an end engaging the steering wheel shaft.

2. The power steering system as claimed in claim 1, further comprising a universal joint connected with the steering wheel shaft.

3. The power steering system as claimed in claim 1, wherein the modular torque actuator includes a redundant electronic controlling and regulating unit (ECU).

4. The power steering system as claimed in claim 1, wherein the gear comprises a belt drive.

5. The power steering system as claimed in claim 1, wherein the gear is a helical worm gear, or a spur gear.

6. The power steering system as claimed in claim 1, wherein an electronic controlling and regulating unit (ECU) actuates the modular torque actuator to produce an additional steering wheel torque adapted to a current vehicle speed.

7. The power steering system as claimed in claim 1, wherein an electronic controlling and regulating unit (ECU) actuates the modular torque actuator to produce an additional steering wheel torque that is adapted to a vehicle's course and a shape of a road.

8. The power steering system as claimed in claim 1, wherein an electronic controlling and regulating unit (ECU) actuates the modular torque actuator to produce an additional steering wheel torque adapted to current vehicle dynamics.

9. A modular torque actuator for applying additional steering torque in a power steering system, the modular torque actuator being mountable to an existing steering wheel shaft as a modular unit, the modular unit comprising a housing, an electric motor mounted on the housing, an output shaft on the motor extending generally parallel to the steering wheel shaft, a gear in the housing connected to the output shaft, a torque sensor for sensing steering wheel torque, and a torque applying shaft connected with the gear, the torque applying shaft configured for engagement with the steering wheel shaft.

10. The modular torque actuator as claimed in claim 9, further comprising a universal joint connected with the steering wheel shaft.

11. The modular torque actuator as claimed in claim 9, wherein the modular unit includes a redundant electronic controlling and regulating unit (ECU).

12. The modular torque actuator as claimed in claim 9, wherein the gear comprises a belt drive.

13. The modular torque actuator as claimed in claim 9, wherein the gear is a helical worm gear or a spur gear.

14. The modular torque actuator as claimed in claim 9 comprising an electronic controlling and regulating unit (ECU) that actuates the motor to produce an additional steering torque adapted to a current vehicle speed.

15. The modular torque actuator as claimed in claim 9 comprising an electronic controlling and regulating unit (ECU) that actuates the motor to produce an additional steering torque adapted to a vehicle's course and a shape of a road.

16. The modular torque actuator as claimed in claim 9 comprising an electronic controlling and regulating unit (ECU) that actuates the motor to produce an additional steering torque adapted to current vehicle dynamics.

17. A power steering system, including a steering gear and a hydraulic actuator for supporting a steering wheel actuation by a driver of a vehicle, the power steering system comprising a modular torque actuator that applies additional steering torque, the modular torque actuator being mounted as a modular unit at a steering-wheel sided end portion of a steering valve of a hydraulic power steering system, the modular unit comprising a housing, an electric motor mounted on the housing, an output shaft on the motor extending generally parallel to a steering wheel shaft, a gear in the housing connected to the output shaft, a torque sensor for sensing steering wheel torque, and a torque applying shaft connected with the gear, the torque applying shaft having an end engaging the steering wheel shaft.

* * * * *